(12) United States Patent
Adams et al.

(10) Patent No.: US 11,815,081 B2
(45) Date of Patent: Nov. 14, 2023

(54) METHOD OF CONTROLLING THE HYDRAULIC FLUID PRESSURE OF A DIAPHRAGM COMPRESSOR

(71) Applicant: Nel Hydrogen A/S, Herning (DK)

(72) Inventors: Joshua Andrew Adams, Herning (DK); Alexander George Murashko, Jr., Webster, NY (US)

(73) Assignee: NEL HYDROGEN A/S, Herning (DK)

( * ) Notice: Subject to any disclaimer, the term of this patent is extended or adjusted under 35 U.S.C. 154(b) by 0 days.

(21) Appl. No.: 16/630,453

(22) PCT Filed: Jun. 28, 2018

(86) PCT No.: PCT/DK2018/050170
§ 371 (c)(1),
(2) Date: Jan. 12, 2020

(87) PCT Pub. No.: WO2019/011385
PCT Pub. Date: Jan. 17, 2019

(65) Prior Publication Data
US 2021/0148352 A1    May 20, 2021

(30) Foreign Application Priority Data

Jul. 13, 2017 (DK) .......................... PA 2017 70570

(51) Int. Cl.
*F04B 45/053* (2006.01)
*F04B 49/00* (2006.01)
(Continued)

(52) U.S. Cl.
CPC ........ *F04B 45/0533* (2013.01); *F04B 49/002* (2013.01); *F04B 43/0081* (2013.01);
(Continued)

(58) Field of Classification Search
CPC . G01L 7/16; G01L 7/185; G01L 7/187; G01L 13/02; G01L 23/30; F04B 45/0533;
(Continued)

(56) References Cited

U.S. PATENT DOCUMENTS 1,563,166 A   11/1925 Corblin
2,597,724 A   5/1952 Gratzmuller
(Continued)

FOREIGN PATENT DOCUMENTS

DE          3704588 A1   8/1988
DE   102010060532 A1   5/2012
(Continued)

OTHER PUBLICATIONS

International Search Report for corresponding application PCT/DK2018/050075 filed Apr. 20, 2018; dated Jun. 14, 2018.
(Continued)

*Primary Examiner* — Philip E Stimpert
*Assistant Examiner* — Dnyanesh G Kasture
(74) *Attorney, Agent, or Firm* — CANTOR COLBURN LLP (57) ABSTRACT

A method of controlling the injection of hydraulic fluid into a high pressure diaphragm compressor having a hydraulic system, the method including: measuring a representation of pressure in a high-pressure part of the hydraulic system of the diaphragm compressor, and maintaining a desired pressure in the high-pressure part of the hydraulic system by adding hydraulic fluid to the high-pressure part of the hydraulic system under the control of a controller on the basis of the measuring of pressure.

23 Claims, 2 Drawing Sheets

(51) Int. Cl.
*F04B 43/067* (2006.01)
*F04B 43/00* (2006.01)
*F17C 7/00* (2006.01)

(52) U.S. Cl.
CPC ......... *F04B 43/067* (2013.01); *F04B 2205/18* (2013.01); *F05B 2270/301* (2013.01); *F17C 7/00* (2013.01); *F17C 2221/012* (2013.01); *F17C 2227/0157* (2013.01)

(58) Field of Classification Search
CPC .......................... F04B 49/002; F04B 43/0081; F04B 2205/18; F04B 43/067; F04B 45/053; F17C 7/00; F17C 2221/012; F17C 2227/0157; F05B 2270/301; F15B 7/10
USPC ............. 417/375, 385, 388; 137/2, 7, 12, 14
See application file for complete search history.

(56) References Cited

U.S. PATENT DOCUMENTS

| | | | |
|---|---|---|---|
| 3,276,673 A | 10/1966 | Jones | |
| 3,416,453 A | 12/1968 | Feuillebois | |
| 3,743,266 A * | 7/1973 | Sturman | F16F 3/02 267/31 |
| 4,488,626 A * | 12/1984 | Handke | F16D 35/005 188/163 |
| 4,527,430 A * | 7/1985 | Leathers | G01L 7/16 73/745 |
| 4,627,292 A | 12/1986 | Dekrone | |
| 4,674,335 A | 6/1987 | Wendt | |
| 5,074,755 A | 12/1991 | Vincent | |
| 5,703,334 A * | 12/1997 | Hansson | G01G 3/1408 177/201 |
| 6,343,614 B1 * | 2/2002 | Gray | F04B 43/0081 417/63 |
| 6,554,578 B1 | 4/2003 | Siegel | |
| 6,672,841 B1 | 1/2004 | Herklotz | |
| 2003/0031565 A1 * | 2/2003 | Kleibrink | F04B 45/0533 417/53 |
| 2003/0089117 A1 * | 5/2003 | Mao | C01B 3/001 62/46.1 |
| 2003/0219346 A1 * | 11/2003 | Abe | F04B 53/16 417/540 |
| 2006/0102149 A1 * | 5/2006 | Furusawa | F02D 41/3094 123/446 |
| 2007/0089382 A1 * | 4/2007 | Miura | F04B 39/04 55/385.1 |
| 2008/0294327 A1 * | 11/2008 | Oono | F02D 41/221 701/104 |
| 2010/0158716 A1 | 6/2010 | Laessle | |
| 2011/0189029 A1 * | 8/2011 | Van De Velde | F04B 43/06 417/53 |
| 2011/0284089 A1 * | 11/2011 | Knuth | F15B 1/26 220/501 |
| 2013/0291645 A1 * | 11/2013 | Gammon | G01L 19/10 73/716 |
| 2013/0323091 A1 * | 12/2013 | Helbling | F15B 11/0423 417/307 |
| 2016/0115850 A1 * | 4/2016 | Otsuki | G01M 15/102 417/472 |
| 2016/0160825 A1 * | 6/2016 | Usui | F04B 53/16 417/307 |
| 2017/0059089 A1 | 3/2017 | Uchida | |
| 2018/0135616 A1 * | 5/2018 | Adams | F17C 13/002 |
| 2018/0283284 A1 * | 10/2018 | Veilleux, Jr. | F02C 9/24 |

FOREIGN PATENT DOCUMENTS

| | | |
|---|---|---|
| DK | 201570293 A1 | 5/2015 |
| ES | 2043540 A2 | 12/1993 |
| FR | 2070037 | 9/1971 |
| FR | 2558256 A1 | 7/1985 |
| KR | 20100111086 A | 10/2010 |
| WO | 2009157026 A1 | 12/2009 |
| WO | 2016184468 A1 | 11/2016 |

OTHER PUBLICATIONS

International Search Report for corresponding application PCT/DK2018/050170 filed Jun. 28, 2018; dated Nov. 6, 2018.
International Search Report for corresponding application PCT/DK2018/050171 filed Jun. 28, 2018; dated Dec. 7, 2018.

* cited by examiner

METHOD OF CONTROLLING THE HYDRAULIC FLUID PRESSURE OF A DIAPHRAGM COMPRESSOR

TECHNICAL FIELD

The present disclosure relates to a method of controlling the hydraulic fluid pressure of a diaphragm compressor, to a diaphragm compressor controlled according to such method.

BACKGROUND

In a diaphragm compressor for pressurizing a fluid the diaphragm is separating a lower hydraulic fluid chamber and an upper fluid chamber. The hydraulic fluid chamber is part of a hydraulic fluid system establishing a pressure in the hydraulic fluid chamber by moving a piston. The pressure makes the diaphragm moving towards the fluid chamber thereby pressurizing the fluid hereof. To ensure full displacement of the diaphragm and to compensate e.g. for leakage at the piston, hydraulic fluid is injected each cycle. When the diaphragm reaches full displacement and the piston has still not finished its discharge stroke, the excess hydraulic fluid in the hydraulic fluid chamber exits the hydraulic fluid chamber and via a passage conducted to a hydraulic fluid reservoir of the hydraulic fluid system.

The known systems have the drawback that the exit of the excess hydraulic fluid leads to loss in efficiency of the compressor.

BRIEF SUMMARY

The present disclosure solves the problem with controlling the maximum hydraulic fluid pressure by a compressor and control hereof according to the inventive method described below.

The disclosure related to a method of controlling the injection of hydraulic fluid into a high pressure diaphragm compressor comprising a hydraulic system, the method comprising: measuring a representation of pressure in a high-pressure part of the hydraulic system of the diaphragm compressor, and maintaining a desired pressure in the high-pressure part of the hydraulic system by adding hydraulic fluid to the high-pressure part of the hydraulic system under the control of a controller on the basis of said measuring of pressure.

The representation of pressure can in an advantageous embodiment of the disclosure be made based on a measurement of volume of hydraulic fluid in the high-pressure part of the hydraulic system.

High pressure is preferably understood as a pressure above 10 MPa, i.e. a reference to a high pressure compressor (or simply a compressor) in this document is to a compressor facilitating pressurizing a gaseous fluid to a pressure of 10 MPA or above.

The high-pressure part of the hydraulic system is preferably referred to as the part of the hydraulic system downstream the injection assembly hereof more specifically downstream the output valve. In the same way, the low-pressure part of the hydraulic system is preferably referred to as the part of the hydraulic system upstream the injection assembly hereof more specifically upstream the output valve.

According to an embodiment of the disclosure, the amount of the added hydraulic fluid to the high-pressure part substantially corresponds to the amount of leaked hydraulic fluid from the high-pressure part to a low-pressure part of the hydraulic system. This is advantageous in that then only a very small amount of hydraulic fluid needs to be added. This leads to a more efficient compressor in that energy is only used on pressurizing the needed amount of hydraulic fluid to pressurize the medium such as gaseous fluid. This is in contrast to known systems where energy is also used on the amount of hydraulic fluid which exits the hydraulic fluid chamber.

Furthermore, it is advantageous in that since the present disclosure only injects hydraulic fluid corresponding to what is leaked stress (e.g. related to heat and flow of the excess hydraulic fluid) is reduced on compressor components in that no excess hydraulic fluid have to return to the low-pressure part.

In a situation with similar properties of the inlet medium (in its gaseous or liquid state) to be pressurized such as a gaseous fluid and no other losses to maintain a given outlet pressure of the gaseous fluid the injected amount should be the same as the leaked amount of hydraulic fluid. If outlet pressure should be increased the injected amount should be higher than the leaked amount and in the same way less if the pressure should be reduced.

The amount (volume) injected to increase pressure is small even one or a few drops of hydraulic fluid more than what is leaked is enough to increase the hydraulic peak pressure. The hydraulic peak pressure is preferably required to be higher than the pressure of the medium such as a gaseous fluid.

According to an embodiment of the disclosure, the amount of the added hydraulic fluid to the high-pressure part is added to the high-pressure part in discontinued periods of time under the control of the controller on the basis of said measured pressure. The discontinued periods of time is determined by the controller based on the measured pressure in the high-pressure part and knowledge of a desired peak pressure target value. Accordingly, hydraulic fluid is not necessarily injected in each compression cycle. Examples of compression cycles in which injection does not happen could be if desired outlet pressure of the pressurized medium is reduced, if properties of the inlet medium such as inlet pressure change, etc.

It should be mentioned, that the pressure of the of the hydraulic fluid in the high-pressure part is measured continuously. With this said the measurement may be "0" value at least during some of the compression cycle. Preferably, towards the peak pressure of a compression cycle measurements are made to be able to determine if in the following compression cycle injection of hydraulic fluid is necessary or not.

According to an embodiment of the disclosure, the diaphragm compressor comprising: an injection assembly forming part of a hydraulic fluid path between the low-pressure part of the hydraulic system and the high-pressure part, and a pressure sensor establishing a feedback signal representing the pressure in the high-pressure part, wherein the controller is controlling the pressure potential of injection of hydraulic fluid into the high-pressure part, by control of the injection assembly based on the feedback signal and a hydraulic fluid peak pressure target value of a desired pressure of hydraulic fluid in the high-pressure part.

According to an embodiment of the disclosure, the injection assembly comprising: an output valve, an injection pump establishing a flow of hydraulic fluid from the low-pressure part to the high-pressure part when the output valve is open, and an injection pump establishing a pressure potential in the injection assembly when a valve is closed and the output valve is closed. The injection assembly comprising components (valve, pumps, etc.) facilitating a controlled injection of hydraulic from the low-pressure part to the high-pressure part of the hydraulic system.

According to an embodiment of the disclosure, the peak pressure of the high-pressure part of the hydraulic system of the diaphragm compressor pressurizing a gas, the diaphragm compressor comprising: the injection assembly forming part of the hydraulic fluid path between the low-pressure part of the hydraulic system and the high-pressure part, the injection assembly comprising: the output valve, the valve, and the injection pump establishing a flow of hydraulic fluid from the low-pressure part to the high-pressure part when the output valve is open, and a pressure sensor establishing a feedback signal representing the pressure in the high-pressure part, wherein the injection pump establishing a pressure potential of injection of hydraulic fluid in the injection assembly when the valve is closed and when the output valve is closed, and wherein a controller is controlling the pressure potential of injection of hydraulic fluid into the high-pressure part, by control of the injection assembly based on the feedback signal and a hydraulic fluid peak pressure target value of a desired pressure of hydraulic fluid in the high-pressure part.

According to an embodiment of the disclosure, the amount of hydraulic fluid injected into the high-pressure part in a compression cycle is determined by the established potential of injection of hydraulic fluid, wherein the potential of injection of hydraulic fluid is controlled by controlling the valve based on the pressure difference between the pressure represented by the feedback signal and the peak pressure target value. Alternatively, the injected amount is simply the amount of hydraulic fluid that can be injected during a period of time where the pressure in the high-pressure part is below the established injection pressure potential.

In practice this amount is determined by the size of established potential of injection of hydraulic fluid i.e. the pressure established in the injection assembly (i.e. between valve, output valve and injection pump) and the inlet gas pressure determining the lowest pressure in the hydraulic fluid chamber and thereby if and for how long time (in a compression cycle) the output valve is open.

Hence a control loop exists where injection pressure potential is controlled based on injection of hydraulic fluid and the amount of hydraulic fluid injected is determined based on the difference between the pressure represented by the feedback signal and the peak pressure target value.

Preferably the hydraulic fluid is an incompressible fluid or a fluid having an as low compressibility as possible. Oil is preferred in that sealing's of the compressor piston is lubricated by oil leaking from the high-pressure part to the reservoir.

Using the feedback signal representing the pressure in the high-pressure part to control the amount of hydraulic fluid to inject, is advantageous in that the otherwise non-detectable leakage of hydraulic fluid at the piston is also compensate for.

According to an embodiment of the disclosure, the peak pressure target value is between 20% and 15%, preferably between 15% and 10%, most preferably between 10% and 5% above the desired pressure of the gas leaving the chamber 14.

It is advantageous to control the pressure of the gas leaving the gas chamber by controlling the pressure of the hydraulic fluid in the high-pressure part. This is because the pressure of the pressurized gas is less stable compared to the pressure of the hydraulic fluid. Hence to avoid calculations, compensations etc. to obtain a precise and reliable control loop it is preferred to use the pressure of the hydraulic fluid in the high-pressure part as feedback in the control loop. To be able to do so sufficient movement of the displacement member to create a resolution of the measurements which is sufficient to use in the control requires a pressure peak target value some percentage above the desired outlet gas pressure.

Further, to be sure to obtain a feedback signal, the pressure peak target value is higher than the desired pressure of the gas leaving the gas chamber.

According to an embodiment of the disclosure, the feedback signal is established by a pressure sensor comprise a housing mounted to the high-pressure part in which a cylinder with a piston in fluidly connection with the hydraulic fluid of the high-pressure part is located, a displacement member and a displacement sensor, wherein the pressure of the hydraulic fluid in the high-pressure part is physically displacing a displacement member and wherein the size of the displacement is measured by a displacement sensor.

The displacement based pressure sensor is advantageous when used on a compressor controlled according to the present disclosure. This is because the inventive control only injects a very small amount of hydraulic fluid leading to only a very small amount of excess hydraulic fluid. Hence because the amount is so small, a flow is difficult to measure. Instead since the excess amount is so small it is possible to guide it to a cylinder of the pressure sensor where it activates a piston, where it again activates the displacement member according to the pressure of the hydraulic fluid.

According to an embodiment of the disclosure, the compressor is used for pressurizing hydrogen gas in a high-pressure storage of a hydrogen refueling station or of a fuel cell vehicle to a pressure above 35 Mpa. This is advantageous in that refueling of a vehicle tank can be made directly from the high-pressure storage or directly from the compressor.

Moreover, the disclosure relates to a diaphragm compressor for pressurizing a gas to a pressure above 10 MPa, the diaphragm compressor comprising: an injection assembly forming part of a hydraulic fluid path between the low-pressure part of the hydraulic system and the high-pressure part, a pressure sensor adapted to establish a feedback signal representing the pressure in the high-pressure part, and a controller adapted to control the injection assembly so as to establish a pressure potential of injection of hydraulic fluid based on the feedback signal and a hydraulic fluid peak pressure target value of a desired pressure of hydraulic fluid in the high-pressure part.

According to an embodiment of the disclosure, the injection assembly comprising:
   an output valve, a valve, and an injection pump adapted to establish a flow of hydraulic fluid from the low-pressure part to the high-pressure part when the output valve is open, wherein the injection pump is furthermore adapted to establish a pressure potential in the injection assembly when the valve is closed and the output valve is closed.

According to an embodiment of the disclosure, the pressure potential of injection of hydraulic fluid is established in the injection assembly.

According to an embodiment of the disclosure, the hydraulic fluid path between the low-pressure part and the high-pressure part in the low-pressure part includes a forward path and a return path, wherein the valve is located in the return path for controlling flow of hydraulic fluid from the injection pump to a hydraulic fluid reservoir. The location of the valve in the return path is advantageous in that by control of the valve facilitates control of the increase of potential of injection of hydraulic fluid by closing for the flow of hydraulic fluid in the return path.

According to an embodiment of the disclosure, the forward path fluidly connects the injection pump to a hydraulic fluid supply station at least one inner wall positioned between the hydrogen fluid inlet from the hydraulic fluid reservoir and the forward path and wherein a hydraulic fluid storage volume is located beneath the at least one inner wall. Although it is possible within the scope of the disclosure to connect the injection pump to the hydraulic fluid reservoir (housing the crank shaft) it is advantageous not to do so. This is because of the movement of the crank shaft, the hydraulic fluid is mixed with air in the reservoir. Accordingly, due to the small amounts of hydraulic fluid which is injected per compression cycle even minor air bubbles may lead to difficulties in reaching the desired pressure in the high-pressure part.

Moreover, the disclosure relates to a pressure sensor comprising a housing connected to a compressor head, the housing comprising a piston movably mounted in a cylinder, the cylinder is fluidly connected to a high-pressure part of a hydraulic system of the compressor, wherein the piston is adapted to be moved in a first direction away from the compressor head by the pressure of the hydraulic fluid in the high-pressure part, the piston is thereby adapted to move a displacement member which is movably attached to the housing by one or more flexible suspensions, and wherein the piston is adapted to be moved in a second direction towards the compressor head by the flexible suspension via the displacement member.

The pressure sensor is advantageous in that it functions as an overpressure protection at the same time as a pressure sensor. This is because the flexible suspension is able to at least temporary absorb pressure increase from the high-pressure part of the hydraulic system of the compressor.

According to an embodiment of the disclosure, the flexible suspensions are implemented as an array of bolts and springs. This implementation is advantageous in that the springs temporary absorbs the pressure from the hydraulic system in one part of the compression cycle and in another part of the compression cycle returns the absorbed pressure to the hydraulic system.

According to an embodiment of the disclosure, the pressure sensor further comprise a displacement sensor adapted to detect the distance of the movement of the displacement member. The compressor comprises a hydraulic system creating a hydraulic pressure which via the diaphragm is pressurizing the gas. The part of the hydraulic systems creating the high-pressure moving the diaphragm is referred to as high-pressure part and is located between the valve and the pressure sensor. In the ideal scenario, the peak pressure of the hydraulic fluid is just enough to move the diaphragm to a position where all of the gas is leaving the gas chamber.

The pressure sensor is adapted to measure the pressure in the high-pressure part. This can be done in various ways hence the pressure sensor may at least be adapted to measure a displacement caused by the pressure and/or a flow of excess hydraulic fluid from the high-pressure part. Accordingly, the feedback signal is either by the pressure sensor or a controller converted to a pressure which is comparable to the peak pressure value.

The housing is preferably connected to the high-pressure part of the hydraulic system of the compressor. It is advantageous in that its connection point to the compressor is not limited to a specific location of the compressor head as long as it is able to fluidly communicate with the hydraulic fluid of the high-pressure part.

The fluid connection/communication path between the high-pressure part and the cylinder is preferably a straight conduit to ensure straight flow of the hydraulic fluid to be able to obtain the most accurate measurement of the pressure.

The displacement member is preferably mounted to the housing by flexible suspensions the load of which is equal to or less than the pressure of the hydraulic fluid when the piston is just before the so-called top dead center of a pressure curve of a compression cycle. This ensures displacement of the displacement member before the compression reaches its top dead center.

The displacement member is preferably a massive block of a metal suitable to withstand the pressure from the piston in one direction and from the suspensions in the opposite direction. Preferably the housing is made of the same material and of a thickness of the cylinder walls that can withstand the pressure from the hydraulic fluid.

By movable mounted should be understood that the piston is "floating" in the cylinder i.e. it is preferably not fastened in any of its ends. At the second end the piston is simply pushing to the displacement member with a pressure equal to the pressure by which the hydraulic fluid is pushing to the first end of the piston. The friction between the piston seal(s) and cylinder walls can be neglected.

According to an embodiment of the disclosure, the displacement member and the piston is made of aluminum, preferably an aluminum alloy. This is advantageous in that weight of the movable piston and displacement member is low in mass to accommodate high frequency cyclic movement. This is in contrary to more heavy masses which may disturb the dynamics between movement and pressure ending up in a delayed feedback signal. Low weight is preferably less than 350 grams for a displacement member having a diameter of about 10 centimeters.

According to an embodiment of the disclosure, the center part of the displacement member which is in physical contact with the head of the piston is made of steel, preferably a steel alloy. This is advantageous in that at the contact point between the piston and displacement member a material is used which is more resistant to wear than the aluminum.

According to an embodiment of the disclosure, the shape of the head of the piston is spherical and wherein the contact point of the displacement member to the piston is concave. This is advantageous in that hereby is obtained an equal pressure to and from the displacement member on the piston. Hence, it is not a problem if the suspensions are not completely evenly loaded.

According to an embodiment of the disclosure, the array of flexible suspensions is fastening the displacement member to the housing so that movement of the displacement member requires a hydraulic fluid pressure above a displacement pressure. The flexibility of the suspensions can be adjusted either by the choice of springs and/or by the torque with which they are held in place between the bolt head and the displacement member. Preferably each of the suspensions (in a preferred embodiment bolts with springs around the threaded part between displacement member and the bolt head) are all tightened with the same torque ensure equal load of the piston.

The displacement pressure is preferably less than or equal to the pressure of the hydraulic fluid at the top dead center.

According to an embodiment of the disclosure, the displacement sensor is a distance sensor, preferably an optic distance sensor. An optic distance sensor is advantageous in that it is very fast i.e. it facilitates performing at least one distance measurement per compression cycle i.e. up to 7-800 measurements per second. The optic sensor is connected to the controller and the distance measurement is transmitted to the controller. The distance measurement is referred to as feedback signal. The displacement of the displacement member i.e. the measured distance is directly linked to pressure of hydraulic fluid in the high-pressure part.

According to an embodiment of the disclosure, the displacement sensor provides the displacement measurements to a controller. Preferably the displacement sensor is sending or the controller is scanning the output of the displacement sensor so that the controller is receiving a signal which represents a distance moved by the displacement member.

This distance is by knowledge of a known reference distance linked to a known pressure and thereby it can be converted to a pressure of the hydraulic fluid. If this pressure is below the pressure peak target value, then the controller controls the injection pump and valve to establish an injection pressure potential allow an amount of hydraulic fluid to enter the high-pressure part. The amount is determined by size of gas inlet pressure, established injection pressure potential and time the gas inlet pressure is lower than the established injection pressure potential. The latter will according to an embodiment of the disclosure facilitate opening an output valve allowing flow from the low-pressure part to the high-pressure part.

According to an embodiment of the disclosure, the compressor is diaphragm compressor compressing hydrogen gas to a pressure of at least 65 Mpa.

The compressor comprises a hydraulic system creating a hydraulic pressure which via the diaphragm is pressurizing the gas. The part of the hydraulic systems creating the high-pressure moving the diaphragm is referred to as high-pressure part and is located between the injection assembly and the pressure sensor. In the ideal scenario, the peak pressure of the hydraulic fluid is just enough to move the diaphragm to a position where all of the gas is leaving the gas chamber. It should be mentioned that the pressure in the high-pressure part is substantially the same in all parts hereof i.e. a feedback signal from the pressure in the hydraulic fluid distribution plate or hydraulic distribution chamber should be understood as a signal representing the pressure in the high-pressure part.

The injection assembly is controlling the injection of hydraulic fluid. To reduce requirements to the injection assembly, the hydraulic fluid is injected when the pressure in the high-pressure part is lowest. Even small (measured in milliliter) quantities of injected hydraulic fluid can make relatively large pressure increase. The controlled amount of hydraulic fluid is preferably added as one amount for fast pressure adaption or in portions for a less fast pressure adaption.

The pressure sensor is adapted to measure the pressure in the high-pressure part. This can be done in various ways hence the pressure sensor may at least be adapted to measure a displacement caused by the pressure and/or a flow of excess hydraulic fluid from the high-pressure part. Accordingly, the feedback signal is either by the pressure sensor or a controller converted to a pressure which is comparable to the peak pressure value.

The controller may be any suitable data processor but preferably it is a standard industrial computer such as a programmable logic controller. Preferably the controller determines the peak pressure target value and a bottom pressure value by calculation, lookup tables or via communication to a data storage where predetermined values may be stored. Preferably, the controller determines the pressure reference (minimum pressure) by sensor input. Based on the pressure represented by the feedback signal and the peak pressure target value, the controller is then able to adjust the injection of hydraulic fluid to obtain a desired pressure of the gas. Control of the injection assembly is control of the components hereof which in an embodiment is output valve, valve and injection pump.

The injection is preferably adjusted by creating a potential of injection. The potential of injection of hydraulic fluid into the high-pressure part is preferably created by running the injection pump which when the valve is closed will create an increase of the potential lowest pressure in the high-pressure part. When this pressure increases to above the lowest pressure in the high-pressure part during a compression cycle injection of hydraulic fluid into the high-pressure part eventually happens. Hence, the pressure created by the pump is now the new lowest pressure in the high-pressure part. If the valve continues to be closed and the injection pump continues to run, the pressure continues to increase and the lowest pressure in the high-pressure part will again in the following compression cycle be increased to the pressure established by the running pump by the amount of hydraulic fluid injected into the high-pressure part during the compression cycle.

The amount of hydraulic fluid and thereby the potential injected of hydraulic fluid into the high-pressure part can be controlled between the capacity of the pump during one compression cycle and nothing by control of the valve between completely closed and completely opened. Hence, the pressure potential is equal to the pressure in the low-pressure part when the valve is fully opened (injection pump is simply circulating oil) and fully closed where pressure potential is continuing to increase until maximum capacity of the injection pump is reached.

Preferably, the injection potential is created between the injection assembly/injection pump hereof and the output valve located in the hydraulic flow path downstream the injection pump.

The compression cycle refers to one cycle of the piston of the hydraulic system i.e. one intake stroke bringing gas into the gas chamber and one discharge stroke discharging pressurized gas.

Controlling the injection assembly includes controlling the components hereof which in a preferred embodiment includes controlling the injection pump located in the hydraulic fluid path and the valve located in the return path (the output valve is preferably pressure regulated such as a check valve).

Determining the hydraulic fluid peak pressure target value of a desired pressure of hydraulic fluid in the high-pressure part may be dynamic or predetermined. The adaptive or dynamic determination may be made during operation by the controller by look-up tables or calculations e.g. based on measurements of inlet pressure, outlet pressure, pressure of hydraulic fluid in the high-pressure part, etc. Alternatively, it may be predetermined i.e. independent from the control of the compressor e.g. by an engineer designing the control of the compressor.

The disclosure is advantageous in that injecting an amount of hydraulic fluid determined by an established potential to increase the pressure just as much as needed to reach a peak pressure target value reduces the amount of excess hydraulic fluid leaving the hydraulic fluid chamber.

Thereby wear of the system is reduce leading to a compressor having less failures and needs fewer service visits compared to similar high-pressure compressors.

Further, the efficiency of the compressor is increased in that no energy is lost in getting rid of excess hydraulic fluid of the hydraulic fluid chamber due to the non-controlled hydraulic fluid injection used in known compressor systems.

Further, when the compressor is in normal operation there is no need for an hydraulic fluid return path from the high to the low pressure parts of the compressor in that only the hydraulic fluid needed to establish a desired pressure is in the hydraulic fluid chamber. The return path however is needed for emergency situations where hydraulic fluid for some reason have to exit the hydraulic fluid chamber.

Further, the injected hydraulic fluid pressure is also sometimes referred to as injection pressure and by controlling the amount of hydraulic fluid so that only the required amount is injected leads at least to the above-mentioned advantages.

According to an embodiment of the disclosure, the hydraulic flow path is separated in the high-pressure part and the low-pressure part by an output valve. Preferably this valve is a check valve and will be referred to as such. However, other types of valves such as electronic controllable valve, pneumatic or hydraulic controllable valve, etc. can be used.

The output valve is advantageous in that the pressure potential can be established between the output valve and the injection pump which is released into the high-pressure part when the inlet gas pressure and thereby the pressure of the high-pressure part is below the established potential.

The output valve is furthermore advantageous in that it protects the injection assembly from the high pressure created by the compressor piston. In a situation, the compressor piston may establish a pressure of 100 MPa and the injection pump a pressure of 70 MPa. Accordingly, without the protection of the output valve, due to this difference, the pressure potential would, each time the compressor piston establishes a pressure above 70 MPa, be equal to the pressure established by the compressor piston.

In addition, with reference to the above example, the output valve also prevents hydraulic fluid from passing back through the injection assembly.

According to an embodiment of the disclosure, the hydraulic supply station is fluidly connected to the hydraulic fluid reservoir. This is advantageous in that when the level (e.g. measured by a level sensor) of hydraulic fluid in the hydraulic fluid reservoir is too high a pump is preferably used to pump hydraulic fluid from the hydraulic fluid reservoir to the hydraulic supply station.

According to an embodiment of the disclosure, the at least one inner wall is a net with holes between 50μ [mu] and 150μ [mu], preferably 100μ [mu].

According to an embodiment of the disclosure, the at least one inner wall is positioned with an angle of inclination relative to a horizontal bottom plane between 1 and 20 degrees preferably between 2 and 10 degrees and most preferably between 3 and 5 degrees. This inner wall is advantageous in that the perforations are so small that they are functioning as air filter for the air bubbles of the received hydraulic fluid. Hence, when the received hydraulic fluid fills up the hydraulic supply station the air bubbles travels up the inclined perforated wall(s) whereas the hydraulic fluid penetrates the perforated wall(s). Preferably, the hydraulic supply station comprises two or more perforated inner walls forming a triangle or funnel through which the hydraulic fluid enters on its way from inlet to outlet of the hydraulic supply station.

The angle of inclination, diameter and density of holes together with the storage volume is advantageous in that it allows filtered (including filtering air bubbles) hydraulic fluid to be collected in the storage volume over time from where it can be sucked up by the injection pump.

According to an embodiment of the disclosure, the pressure is increased during a plurality of compression cycles following the compression cycle during which the feedback signal representing the pressure of the high-pressure part was below the peak pressure target value. This is advantageous in that adjusting the pressure in just one compression cycle following the compression cycle in which the feedback signal was obtained would require a sophisticated injection assembly. However, in case the pressure is adjusted in the subsequent compression cycle, the wear of the compressor would be reduced.

According to an embodiment of the disclosure, the feedback signal representing the pressure in the high-pressure part is measured in each compression cycle.

According to an embodiment of the disclosure, the diaphragm is in physical contact with the inner surface of the gas chamber prior to the pressure of the high-pressure reaches the pressure peak value. This is advantageous in that then the diaphragm is discharging all of the gas in the gas chamber in each compression cycle. It should be mentioned that the gas chamber may comprise voids from where minor quantities of the gas cannot escape.

The contact between the diaphragm and the inner surface of the gas chamber is preferably at least made between the inlet port and the outlet port.

According to an embodiment of the disclosure, the controller is controlling the potential of injection of hydraulic fluid so that the pressure in the high-pressure part is always above a reference potential which is equal to or higher than the inlet pressure of the gas. This is advantageous in that this prevents the diaphragm from getting in contact with the bottom of the hydraulic fluid chamber and thereby avoiding cavitation.

The control of the lower pressure is preferably made based on a reference pressure measurement obtained from a pressure sensor measuring the pressure of the gas entering the gas chamber and/or the signal from the pressure sensor.

According to an embodiment of the disclosure, the controller is controlling the injection of hydraulic fluid into the high-pressure part so that injection is possible during the intake stroke of a compression cycle where the pressure of the hydraulic fluid in the high-pressure part is being reduced. Injecting hydraulic fluid in the beginning of the compression cycle following the compression cycle where the feedback signal indicated a pressure increase was needed is advantageous in that the requirements to the injection pump is reduce. This is because at the beginning of a compression cycle the pressure in the high-pressure part is low. It should be mentioned that the injection of hydraulic fluid requires that the output valve opens and which according to an embodiment of the disclosure is the case when the established potential upstream the output valve is higher that the pressure downstream the output valve.

According to an embodiment of the disclosure, the displacement member is movably mounted to the housing by means of an arrangement of springs and bolts. The electromagnetic force is advantageous in that this enables electrically adjustable of the force (and thereby hydraulic fluid pressure) which is needed to displace the displacement member.

The mechanical arrangement with bolts holding springs between the bolt head and the displacement member is advantageous in that it does not require any control i.e. the force needed from the hydraulic fluid pressure to displace the displacement member is constant. Accordingly, the processing of the size of the displacement is less complicated.

According to an embodiment of the disclosure, the pressure sensor is a pressure control valve connected to the high-pressure part comprising a flow sensor for measuring an amount of hydraulic fluid leaving the high-pressure part. The pressure control valve could be a spring-loaded valve opening for flow of hydraulic fluid at a pressure determined by safety margins of the compressor design.

Even though this is possible Feedback may also come from measurement of pressure of the gas, however it is preferred to obtain feedback from the expansion chamber in that this is more precise to the amount of excess hydraulic fluid and thereby the control of the amount of injected hydraulic fluid can be controlled more precisely.

According to an embodiment of the disclosure, the pressure sensor is connected to the hydraulic fluid distribution plate or to the hydraulic fluid chamber. Due to the high working pressure of the compressor the pressure sensor needs to be securely connected to the compressor. The easiest way of doing so is by means of bolts to either the hydraulic fluid chamber or the hydraulic fluid distribution.

According to an embodiment of the disclosure, the displacement sensor is a distance sensor, preferably an optic distance sensor. An optic distance sensor is advantageous in that it is very fast i.e. it facilitates performing at least one distance measurement per compression cycle i.e. up to 7-800 measurements per second. Furthermore, an optic sensor is accurate in its measurements.

The optic sensor is connected to the controller and the distance measurement is transmitted to the controller. The distance measurement is referred to as feedback signal. The displacement of the displacement member i.e. the measured distance is directly linked to pressure of hydraulic fluid in the high-pressure part.

Alternative sensor types which may be used includes inductive and ultrasonic sensors.

According to an embodiment of the disclosure, the displacement sensor certified to be located in an explosive atmosphere. Since the preferred gas to compress is hydrogen, the atmosphere in which the compressor is located is explosive. Accordingly, the displacement sensor should be safe to use in such area. This can be obtained by sealing the sensor housing, using low power measurement module and communication module, etc.

According to an embodiment of the disclosure, the feedback signal is at least received when the diaphragm is in the upper half of its movement towards the inner surface of the gas chamber. Preferably there is no feedback signal from the pressure sensor when the pressure of the high-pressure part is a certain level below the peak pressure target value. Preferably, only when the diaphragm is on the last part of its way to the top position (referred to as top dead center) and cannot increase the pressure of the gas in the gas chamber anymore, the pressure increase in the high-pressure part is measured by the pressure sensor.

Together with the controlled injection of hydraulic fluid, according to an embodiment of the disclosure this is advantageous in that then no return path for the hydraulic fluid to the low-pressure part of the hydraulic system is needed during normal operation.

According to an embodiment of the disclosure, the gas is hydrogen

According to an embodiment of the disclosure, the hydraulic fluid is a hydraulic oil.

Moreover, the disclosure relates to a method of controlling the peak pressure of the high-pressure part of the hydraulic system of the diaphragm compressor pressurizing a gas, the diaphragm compressor comprising: an injection assembly forming part of the hydraulic fluid path between a low-pressure part of the hydraulic system and the high-pressure part, the injection assembly comprising: an output valve, a valve and an injection pump establishing a flow of hydraulic fluid from the low-pressure part to the high-pressure part when the output valve is open, and a pressure sensor establishing a feedback signal representing the pressure in the high-pressure part, wherein the injection pump establishing a pressure potential of injection of hydraulic fluid when the valve is closed and when the output valve is closed, and wherein a controller is controlling the pressure potential of injection of hydraulic fluid into the high-pressure part, by control of the injection assembly based on the feedback signal and a hydraulic fluid peak pressure target value of a desired pressure of hydraulic fluid in the high-pressure part.

According to an embodiment of the disclosure, the pressure potential of injection of hydraulic fluid is established in the injection assembly.

According to an embodiment of the disclosure, the pressure sensor is connected to the hydraulic fluid distribution plate or the lower compressor head. This location is advantageous in that here it is possible to obtain a short and direct fluid path between the hydraulic fluid and the cylinder of the pressure sensor.

Further, this location is advantageous in that the oil distribution plate and the lower compressor head are large rigid parts to which the pressure sensor can be securely mounted or connected e.g. by means of an array of bolts.

According to an embodiment of the disclosure, the cylinder end towards the displacement member is closed only leaving an opening through which the piston can obtain mechanical contact with the displacement member. This is advantageous in that then the piston so to speak is closing the conduit in which the hydraulic fluid is able to leave the high-pressure part and at the same time the pressure of the hydraulic fluid can be transmitted to the displacement member.

Moreover, the disclosure relates to a hydrogen fueling station comprising a first hydrogen storage and a second hydrogen storage and a compressor having an oblong shaped chamber moving hydrogen in a first pressure of the first hydrogen storage to a second pressure in the second hydrogen storage.

BRIEF DESCRIPTION OF THE FIGURES

In the following, a few exemplary embodiments of the disclosure are described with reference to the figures, of which

DETAILED DESCRIPTION

Figure 1:
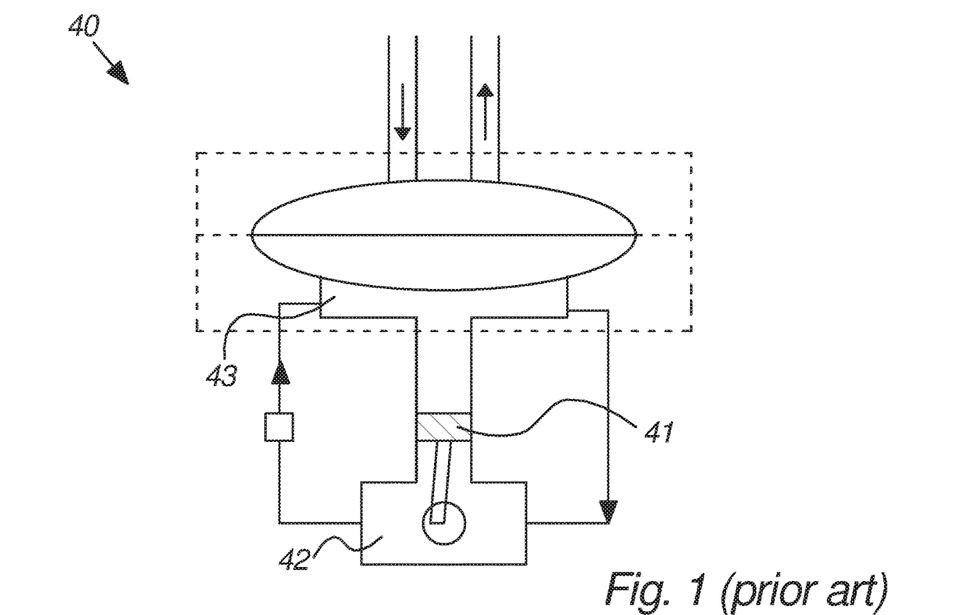
FIG. 1 illustrates an example of a prior art compressor

FIG. 1 illustrates an example of a prior art type of control of the hydraulic pressure in a diaphragm compressor. A pump is simply pumping oil from the hydraulic fluid reservoir into the oil chamber and as explained, when the diaphragm reaches its maximum, the excess oil exits the oil chamber via a return path to the reservoir. The amount of oil pumped into the oil chamber is the same for each compression cycle and "enough" to ensure that some quantity exist the oil chamber and thereby maximum pressure have been reached.

Figure 2:
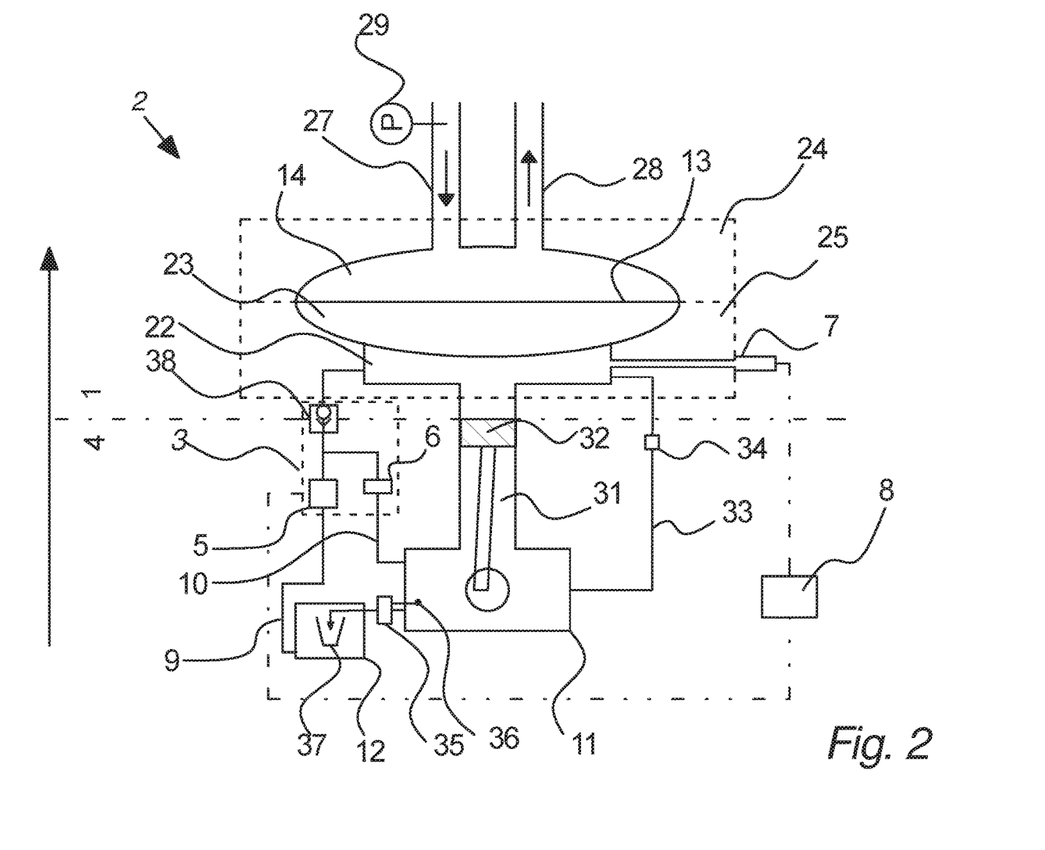
FIG. 2 illustrates an example of a compressor according to an embodiment of the present disclosure

FIG. 2 (and the other figures) illustrates a preferred embodiment of the present disclosure, hence the description in relation to the figures should only be understood as such leaving room for changes to the description still being within the scope of the disclosure.

A compressor 2 having an upper compressor head 24 in which a gas chamber 14 is present and a lower compressor head 25 in which a hydraulic fluid chamber 26 is present.

The upper compressor head 24 has a gas inlet port 27 and a gas outlet port 28. The pressure of the gas inlet may be measured by a pressure sensor 29.

The lower compressor head 25 is part of a high-pressure part 1 illustrated above the dot/dash line. Hence, the high-pressure part 1 is found downstream the injection assembly 3 including part of a hydraulic fluid flow path, hydraulic distribution plate 22, hydraulic chamber 26 and part of the compressor cylinder 31 above the compressor piston 32 and a pressure sensor 7.

Illustrated is also an emergency vent line 33 from the high-pressure part 1 to the hydraulic fluid reservoir 11 (referred to as reservoir). Flow in the emergency vent line 33 is controlled by an emergency valve 34. The emergency valve 34 is preferably controlled mechanically so that if the pressure of the exceeds a predetermined value the emergency valve 34 opens and pressure is reduced in the high-pressure part 1 a hydraulic fluid exits to the reservoir 11. Accordingly, this emergency vent line is not part of control of the hydraulic pressure in the high-pressure part 1 but is only used in case of emergency as a so-called second stage overprotection.

Below the dot/dash line dividing the hydraulic system at the output valve 38 and compressor piston 32 is the low-pressure part 4. Hence the low-pressure part 4 is found upstream the injection assembly 3 including part of a flow path, reservoir 11, hydraulic fluid supply station 12 (referred to as supply station) and connection hereto illustrated by a pump 35. The pump 35 facilitates pumping hydraulic fluid from the reservoir 11 to the supply station 12. In addition, the connection may comprise not illustrated filters or venting components.

It should be mentioned, that the pressure in the part of the hydraulic flow path downstream the injection assembly 3 is normally higher that the pressure of the part upstream the injection assembly 3. Normally, the pressure in the injection assembly 3 (between the injection pump 5, valve 6 and output valve 38) is close the to the gas inlet pressure so that an increased pressure (pressure potential) above this pressure can be established fast.

The output valve 38 is preferably a check valve or another kind of mechanically controlled pressure valve but could also be an electrically controlled valve.

The pump 35 is controlled by a level sensor 36. When the level of hydraulic fluid in the reservoir 11 is above a predefined level, the hydraulic fluid is pumped to the supply station 12. As illustrated, the supply station 12 comprise diagonal like walls 37 through which the hydraulic fluid has to travel. Therefore, the walls 37 are perforated or designed as a net having meshes between 50µ [mu] and 150µ [mu], preferably 100µ [mu]. The walls 37 may be implemented as forming a basket in which the hydraulic fluid from the reservoir 11 enters mixed with air and when leaving the basket through the walls 37 ending in a reservoir without the air.

Due to this small size of the holes and surface tension air bubbles mixed into the hydraulic fluid is filtered away traveling towards to the top of the supply station 12 leaving air free hydraulic fluid to be ready to be sucked up into the forward path 9 by the injection pump 5.

As illustrated the injection assembly 3 is located in the flow path between the high and low-pressure parts 1, 4. Besides the injection pump 5, the injection assembly 3 comprise a valve 6 which is preferably located in the return path 10 and the output valve located in the flow path to the high-pressure part 1.

Preferably, the injection pump is continuously pumping hydraulic fluid from the supply station 12 to compensate for leakages at the compressor piston 32. In addition, the continuous pumping is used to create an injection pressure potential which is at a level controlled by how much of the hydraulic fluid is allowed to circulate back to the reservoir 11.

It should be mentioned, that the forward path 9 could also simply be connecting the reservoir 11 and the injection pump 5. However, due to the movement of the compressor piston 32 the hydraulic fluid in the reservoir 11 is mixed with air which is then sucked up into the injection pump 5 and further into the high-pressure part 1. Air is not desired in the high-pressure part in that it air is compressible i.e. opposite of desired property of the hydraulic fluid hence with air in the hydraulic fluid the compressed less effective as without. Accordingly, to avoid this the supply station 12 is developed to filter air.

It should be mentioned that the valve 6 could also be located downstream the injection pump 5, however this location is not preferred in that it will lead to less flexibility in control of the injection pump and pressure potential. One reason for this is that the pump then needs to be stopped when a given pressure potential is reached in order not to exceed it.

A controller 8 is controlling the operation of the compressor. The controller 8 is communicating at least with the injection assembly and the pressure sensor 7. The same or other controllers may facilitate control of the pump 35, operation of the piston 32, control of the gas in/outlet and other not illustrated elements in relation to operation of the controller.

The hydraulic fluid is preferably an incompressible oil which when leaking around the piston sealing is used for lubrication hereof. Any fluid having limited compression properties which at the same time may facilitate lubrication may in principle be used as hydraulic fluid.

The pressure sensor 7 is on FIG. 2 illustrated as attached to the lower compressor head 25 including the hydraulic distribution plate 22 and hydraulic fluid chamber 23. In relation to location of the pressure sensor 7 it should be mentioned that it in principle can be located anywhere in the high-pressure part 1. Only real limiting factor for its location is that it should be able to be firmly attached to comply with the pressures created by the compressor which may be up to and above 100 MPa. This makes the lower compressor head 25 the obvious choice.

At FIG. 2 the hydraulic fluid distribution 22 plate has a fluid path fluidly connecting it to the pressure sensor 7. As mentioned a similar fluid path could connect the pressure sensor 7 to the hydraulic fluid chamber 23 or the hydraulic fluid flow path from the injection assembly 3 to the lower compressor head 25.

Figure 3:
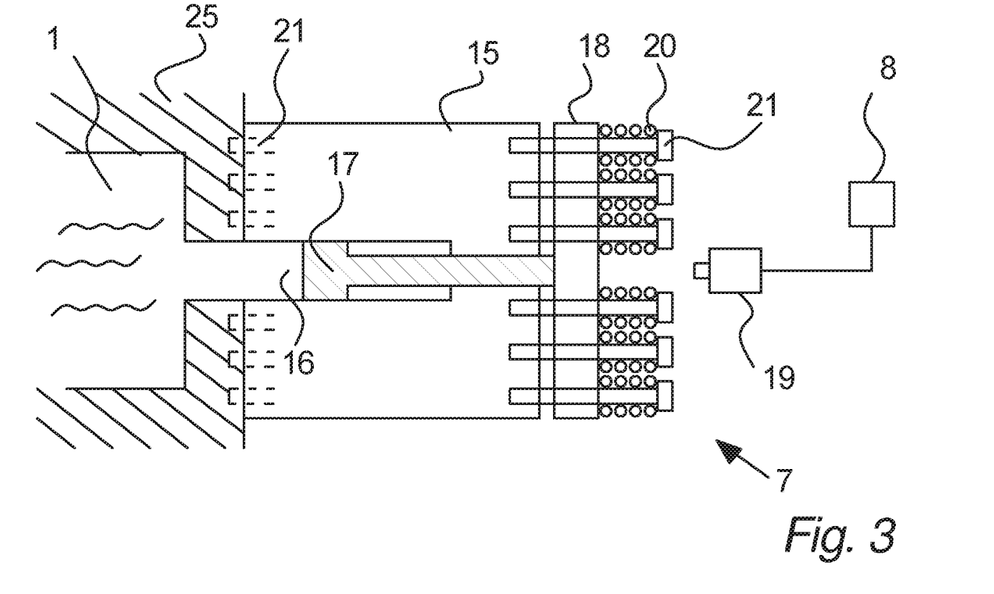
FIG. 3 illustrates a pressure sensor according to an embodiment of the present disclosure.

FIG. 3 illustrates the pressure sensor 7 according to an embodiment of the disclosure. As mentioned, it is not important to which part of the high-pressure part 1 of the compressor 2 the pressure sensor 7 is attached.

At FIG. 3 the housing 15 of the pressure sensor 7 is illustrated as attached to the lower compressor head 25 by means of bolts 21. Preferably the lower compressor head 25 comprise a threated part and the housing 15 comprise not illustrated ducts through which bolts 21 can reach the threated part and thereby fastening the housing 15 to the compressor 2. Other ways of fastening depending on where the housing is connected to the high-pressure part 1 could also be used.

At the opposite end of the housing 15 a displacement member 18 is movably attached to the housing 15 by means of flexible suspensions such as an array of bolt 21/spring 20 arrangements. The torque with which the bolts 21 is tightened and the tension of the springs 20 are determining for the movement of the displacement member 18 at a giver pressure. Hence, by adjusting this the movement can be adjusted.

The pressure sensor 7 comprise a cylinder 16 in which a piston 17 is movable. In one direction, away from the compressor 2 the movement is determined by the pressure of the hydraulic fluid and in a second direction, towards the compressor 2 the movement is determined by the displacement member 18.

At FIG. 3, the piston has moved the displacement member 18 away from the compressor 2 accordingly, the pressure in the high-pressure part 1 has reached or is close to its maximum pressure.

Attached to or in relation to the pressure sensor 7 is illustrated a displacement sensor 19 the purpose of which is to measure the length or size of the movement of the displacement member 18 caused by the piston 17. The displacement sensor 19 is communicating with the controller 8 hence a control loop is established where the control of the injection assembly 3 is made based on feedback from the pressure sensor 7.

Typically, the displacement member 18 is moved less than 1 millimeter. The adjustment of the size of the movement is aligned with a given pressure during a test phase. Prior to the test phase, an estimate of the needed load (spring load, in the embodiment where springs are used as flexible suspensions) is calculated based on expected pressure of the hydraulic fluid and area of the cylinder 16. Then the springs 20 are adjusted to counter act this load which is also referred to as displacement pressure. Accordingly, the pressure acting on the piston 17 from the hydraulic fluid have to be higher than the displacement pressure to move the displace member 18.

During the test phase the displacement pressure is fine-tuned e.g. by mechanically adjusting the displacement pressure until a desired displacement is found at a desired pressure. The desired pressure is referred to as pressure peak target value whereas the actual measured pressure is referred to as pressure peak value. One non-limiting example is that at a pressure peak value of 100 MPa, the size of the displacement is adjusted to be 0.05 mm [millimeter].

The relation between the size of the measured displacement and the pressure in the high-pressure part 1 is according to a non-limiting embodiment as follows. The springs 20 holding the displacement member 18 is fixed so that at a pressure of e.g. 100 MPa the displacement member is moving e.g. 0.05 mm. Accordingly, if only 50 MPa is needed the measured displacement should only be 0.025 mm. Therefore, no establishing of injection potential of hydraulic fluid above inlet pressure is initiated if a displacement of more than 0.025 mm is measured.

The pressure drops in the high-pressure part 1 due to leakage at the compressor piston 32 hence when the measured displacement as consequence hereof drops below 0.025 mm e.g. to 0.020 mm the valve 6 is closed facilitating establishing potential of injection of hydraulic fluid into the high-pressure part 1.

The establishing of the potential of injection is simply made by closing the valve 6 during one or more preferably successive compression cycles. During a compression cycle where the inlet gas pressure is lower than whatever pressure established upstream the output valve 38 this will lead to an injection of hydraulic fluid in the high-pressure part. The injection happens due to pressure equalization between the part of the hydraulic flow path in which the potential is established (i.e. the part from the injection pump 5/(preferably completely closed) valve 6) to the output valve 38. This will in the following compression cycle lead to an increase in the pressure in the hydraulic pressure chamber and thereby to an increased displacement of the displacement member 18 (at least if the injected amount is higher than what is leaking via the compressor piston 32). Hence when the measured displacement again is 0.025 mm or above the establishing of pressure potential is stopped again by opening the valve 6.

The injection pressure potential is in the ideal scenario established as follows. The gas inlet pressure measured by sensor 29 is used as reference pressure (also referred to as reference 0) for the pressure potential. Accordingly, an injection pressure potential is increased by closing valve 6 thereby allowing the injection pump 5 to increase the pressure between valve 6, output valve 38 and injection pump 5. The pressure here continues to increase until it is above the reference pressure which will open output valve 38 allowing an injection of hydraulic fluid into the high-pressure part 1. Even the small amount/volume of hydraulic fluid that can be injected in a compression cycle is enough to increase the peak pressure value in the following compression cycle.

If no injection pressure potential is desired the valve 6 is kept open thereby the injection pump 5 only pumps hydraulic fluid from the supply station 12 to the reservoir 11 without establishing an injection pressure potential.

Accordingly, in the ideal scenario, the valve 6 is controlling the pressure between valve 6, output valve 38 and injection pump 5 to be just above or just below the reference pressure.

The simplest way of implementing flexible suspension is the illustrated bolt/spring arrangement. Alternative to the arrangement of bolts 21, one threaded rod can be used about which the displacement member 18 can be turned thereby moving towards or away from the housing 15 changing the tension on the springs 20. Yet another alternative is to use an electromagnetic controllable displacement member 18 using the electricity to control tension from the displacement member 18 on the springs 20. In the two alternatives one spring may be used at the center of the displacement member 18.

It should be mentioned that it may be possible to implement an electronic controllable gearing facilitating an adjustment of the spring load of the flexible suspension.

In addition to establishing a feedback signal representing the pressure in the hydraulic fluid chamber 23, the pressure sensor 7 furthermore has a function of overpressure protection. This is because when the diaphragm 13 is in its top position and pressure is still increasing e.g. due to compressor piston 32 has not reached its top position, then this additional volume of hydraulic fluid is pushed into the pressure sensor 7. Here this volume is pushing the piston 17 which again is pushing the displacement member 18 and thereby expanding/increasing the volume in the cylinder 16. By this additional volume, the pressure sensor 7 is able to absorb the additional volume of hydraulic fluid (pressure is absorbed) and a first state overpressure protection is provided.

The principle of this first stage overpressure protection is the same as the principle leading to establishing the feedback signal representing the pressure in the hydraulic fluid chamber 23 during normal operation of the compressor. Hence, during an abnormal operation of the compressor the displacement of the displacement member 18 is still measured and provided to the controller, but now the displacement represents a pressure which is above normal operation pressure.

As mentioned, in addition to the first stage overpressure protection a second stage overpressure protection is also included in the compressor design. The first stage overpressure protection is limited to absorb a fixed amount of hydraulic fluid/pressure which is sufficient to protect the compressor during normal operation. The fixed amount is equal to a pressure which the flexible suspension can absorb. However, in the unlikely event of failure of the compressor control or part, the second state overpressure protection (emergency line 33 and valve 34) is used to relief pressure from the hydraulic fluid chamber 32 by leading the hydraulic fluid to the reservoir 11.

Figure 4:
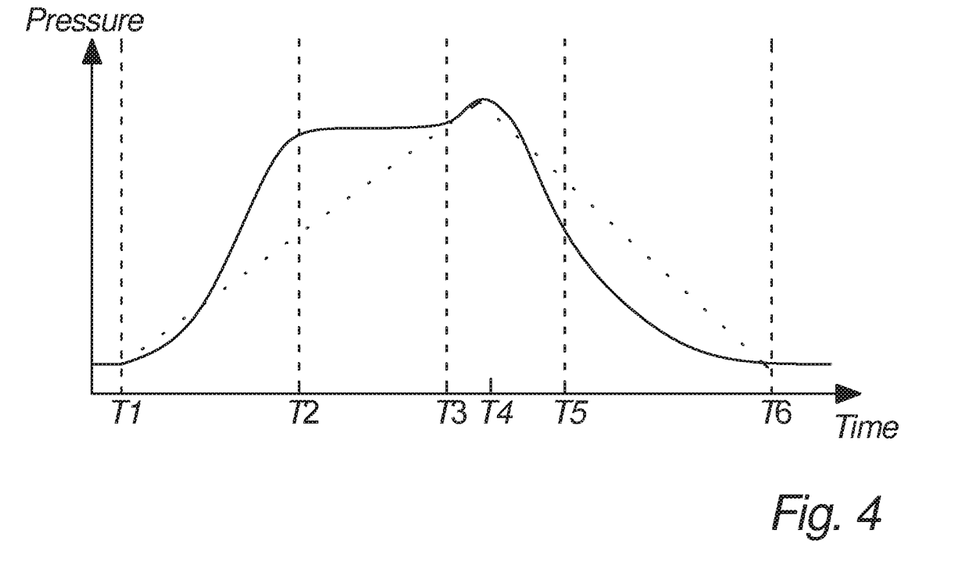
FIG. 4 illustrates a pressure curve of a compression cycle according to an embodiment of the present disclosure.

FIG. 4 illustrates the principles of a compression cycle according to an embodiment of the disclosure. One compression cycle exists between T1 and T6 including one movement up and down of the diaphragm 13. The movement of the compressor piston 32 is illustrated as the dotted line.

Between T1 and T3 the diaphragm 13 is moving up towards the gas chamber 14 thereby pressurizing the gas therein. From T2 the pressure is kept constant by opening the gas outlet 28 thereby discharging the now pressurized gas. At T3, the gas chamber 14 is empty (at least close to, there might be some gas left in the gas chamber in small voids e.g. in relation the inlet port, etc.) and the pressure continues to increase until the compressor piston 32 is in its top position at T4. As illustrated, the compressor piston 32 moves up from T1 to T4.

In an embodiment, the pressure sensor 7 comprises a displacement member 18 which is moving according to the initial load adjustment of the flexible suspension holding it. In an embodiment, the displacement member 18 is starting to move at a pressure of e.g. 35 MPa and as the pressure increases towards a pressure peak value of e.g. 80 MPa the size of the displacement of the displacement member 18 increases with the pressure increase.

The pressure increase and the displacement of the displacement member is not necessarily linear in that. In the situation of non-linearity, the calculations of pressure of a given displacement is more complex than in the situation of linearity. In practice this may result in the following, if an outlet pressure of the gaseous fluid of 100 MPa is desired, the pressure peak target value may be 110 MPa to ensure measurable displacement of the movement of the displacement member 18. If the desired outlet pressure instead is 50 MPa, the pressure peak target value may be 70 MPa.

At T3 where there is no more gas in the gas chamber 14, the pressure increases again which is measurable as a displacement of the displacement member 18.

Typically, the load adjustment of the flexible suspension first enables measurement of displacement of the displacement member 18 when the pressure in the high-pressure part 1 is more than 50% of the peak pressure target value. At FIG. 4, an example of a desired interval of pressure measured by the pressure sensor 7 is illustrated.

At T4 (referred to as top dead center of the piston 32), the pressure starts to decrease in that the piston 32 starts to move towards the hydraulic fluid chamber 23. The remaining gas in the gas chamber 14 expands, gas is introduced into the gas chamber 14 via the gas inlet 27 until the compression cycle ends at T6 to start over again as described from T1.

As described, the disclosure is advantageous in that it is able to reduce the top dead center pressure and thereby the load and thereby increase the efficiency of the compressor in that no excess hydraulic fluid has to exit the hydraulic distribution plate 22/hydraulic fluid chamber 23. This is obtained by using the feedback from the pressure sensor 7 in the control of the pressure potential established by the injection assembly 3.

The pressure in the high-pressure part 1 is extremely difficult to predict in that it depends on the how much hydraulic fluid is leaking via the compressor piston 32 and the inlet pressure of the gas entering the gas chamber 14, properties with the gas, etc.

Therefore, the peak pressure target value is chosen to be above the desired pressure of the pressurized gas leaving the outlet port 28. The peak pressure target value should be high enough to facilitate movement of the displacement member 18, but still not higher than the hydraulic fluid causing the extra pressure from T3 to T4 can be absorbed by the flexible suspensions. Preferably the peak pressure target value is therefore about 10% higher than the desired pressure of the pressurized gas leaving the outlet port 28. The percentage is of course determined by the dimensions of the pressure sensor 7, cylinder 16 and flexible suspensions. An example of difference between outlet pressure of gaseous fluid and pressure peak target value is illustrated on FIG. 3.

The solution invented to balance the load/efficiency optimization and still be sure to establish the peak pressure is to control the injection assembly 3 based on feedback from the pressure sensor 7. One example for illustration of the control will now be described.

As mentioned, the minimum pressure in the high-pressure part 1 is controlled so that it is equal to or just above the inlet pressure of the gas entering the gas chamber 14. The gas inlet pressure is preferably measure by the pressure sensor 29 and communicated to and used by the controller 8 to establish a pressure reference based on which the injection assembly 3 controls the injection pressure potential. This is to avoid the gas pressure moving the diaphragm towards the bottom of the hydraulic fluid chamber.

It should be mentioned that if for some reason there is too much hydraulic fluid in the hydraulic chamber (and thereby too high gas outlet pressure), then to facilitate a pressure decrease (reduce volume of hydraulic fluid in hydraulic chamber), the valve 6 is controlled (opened) so that the pressure established by the injection pump 5 is just below the reference pressure. Thereby no injection pressure potential is established and thereby no hydraulic fluid is injected into the high-pressure part 1. The pressure in the high-pressure part will then drop by the leakage at the piston 32.

Just as long as the pressure established by/in the injection assembly 3 is below the reference pressure no hydraulic fluid is injected into the high-pressure part 1. How much below doesn't matter.

In an example the gas inlet pressure is 20 MPa and used as pressure reference (0 reference) for the injection potential controlled via the injection assembly 3. Hence a first purpose of the injection assembly 3 is ensuring that the diaphragm do not contact the bottom of the hydraulic fluid chamber 23.

The pressure reference of 20 MPa is in the controller 8 linked to a size of displacement of the displacement member 18 which in this example could be $\frac{1}{100}$ of a millimeter. Accordingly, if the size of displacement measured by the pressure sensor 7 at T1/T6 is less than $\frac{1}{100}$ of a millimeter the controller 8 via the injection assembly 3 increases the potential of injection of hydraulic fluid.

A second purpose of the injection assembly 3 is the inject hydraulic fluid in the high-pressure part 1 to increase/control the pressure peak value.

The maximum pressure in the high-pressure part 1 is controlled as close as possible to peak at a peak pressure target value. The peak pressure target value is determined to be e.g. 5%-15% higher than the pressure of the gas leaving the gas chamber. The pressure in the high-pressure part 1 is controlled as follows.

The injection pump 5 is preferably running continuously in each compression cycle to compensate for the leaking hydraulic fluid at the compressor piston 32 and for changes in the gas inlet pressure or outlet pressure. The amount of hydraulic fluid needed is however as mentioned very difficult to predict. The present disclosure suggests to use movement of the displacement member 18 to solve this problem.

Hence, as an example if a displacement of 0.1 mm is measured at a pressure of 100 MPa, then a measurement of 0.05 mm represents a pressure of 50 MPa, etc. If the pressure peak target value is determined to be 50 MPa and a measurement of less than 0.05 mm is measured, then the injection assembly 3 is controlled to increase the injection pressure potential.

Accordingly, during the part of the compression cycle where the output valve 38 is closed and the valve 6 is controlled (preferably closed or at least partly closed) to reduce the amount of hydraulic fluid which is possible to flow through the return path 10. Thereby, an injection pressure potential is established in the hydraulic flow path between the valve 6, injection pump 5 and output valve 38 (i.e. in the injection assembly 3). In this part of the hydraulic flow path, a pressure higher than the inlet pressure is then established which eventually will open the output valve 38 and via pressure equalization hydraulic fluid will be injected to the high-pressure part 1. The volume of the amount of injected hydraulic fluid will then increase the pressure peak value, if not enough to displace the displacement member at least 0.05 mm the valve 6 is kept closed for one more cycle and so on until the measurement of 0.05 mm representing a pressure of 50 Mpa has been measured.

As understood the inventive control is dynamic and is preferably adjusting the amount of hydraulic fluid in each compression cycle to optimize the peak pressure in the high-pressure part of the hydraulic system of the diaphragm compressor.

In the same way if e.g. gas inlet pressure decreases, to ensure the diaphragm continues to allow as much gas in the gas chamber as desired, the injection assembly 3 may be controlled to reduce pressure/amount of hydraulic fluid in the high-pressure part 1 by opening (or at least partly opening) the valve 6.

Preferably, the piston 17 and displacement member 18 are two independent components, however with this said it should be mentioned, that they may be made from one piece of material.

As is now clear from the above description that the peak pressure value of the hydraulic fluid is measured by displacement of the displacement member 18 of a pressure sensor 7. In relation to a desired peak pressure target value, if the peak pressure value is insufficient, this is measured by an insufficient displacement of the displacement member 18 and the injection potential is increased i.e. the injection pressure established by the injection assembly 3 is increased. In the same way in relation to the desired peak pressure target value, if peak pressure value is too high, this is measured by an excessive displacement of the displacement member 18 and the injection potential is reduced i.e. the injection pressure established by the injection assembly 3 is reduced.

As understood from the above description, the disclosure enables a control of the peak pressure in the hydraulic system by only adding a small amount of hydraulic fluid to the hydraulic system more specific to the high-pressure part 1 hereof. As mentioned in the ideal high-pressure compressor 2 only leakage between low and high-pressure part 1, 4 is via the compressor piston 32. Accordingly, the amount (also referred to as volume) of leaked hydraulic fluid is very small hence to maintain balance between desired pressure and leaked hydraulic fluid only an equal amount of hydraulic fluid requires to be added. If on the other hand the pressure needs to be increased, only a small amount (measured in milliliters or drops) more than the leaked amount needs to be added.

The pressure sensor 7 preferably does not measure pressure of the hydraulic fluid directly but instead measures volume of the hydraulic fluid. Since the hydraulic fluid is incompressible when exposed to a pressure, the volume stays the same. This leads to displacement of the displacement member 18 of the pressure sensor 7 since it is in fluidly communication with the high-pressure part 1. During test and calibration, a given displacement is linked to a given pressure and in this way by observing the displacement the pressure of the hydraulic fluid is established.

A further advantage of the present disclosure is that because the amount of injected hydraulic fluid is controlled, it is possible to determine the amount of hydraulic fluid leaking via the compressor piston 32. This information may be used to determine state of health of at least the piston and piston seals. When the injected amount of hydraulic fluid (compensated for change in inlet/output pressure) is monitored over time, at least a tendency of increase injection of maintain a giver pressure can be established. Such increase may indicate that the seals maybe are damaged or defect. The latte may be observed if the tendency of the amount of hydraulic fluid injected starts to increase with a steeper slope.

The above described method of controlling the peak pressure of the hydraulic fluid enables a wider range of operation speeds compared to know injection systems for compressor.

The invention claimed is:

1. A method of controlling the injection of hydraulic fluid into a high-pressure diaphragm gas compressor comprising a hydraulic system comprising a low-pressure part and a high-pressure part, the method comprising:

measuring pressure in the high-pressure part of the hydraulic system of the diaphragm gas compressor, the high-pressure part includes a lower compressor head having a hydraulic fluid chamber separated from an upper compressor head having a gas chamber by a diaphragm, and maintaining a desired pressure in the high-pressure part of the hydraulic system by adding hydraulic fluid to the hydraulic fluid chamber of the high-pressure part of the hydraulic system from an injection assembly of the low-pressure part, the injection assembly comprising an injection pump, an output valve and another valve, and wherein a pressure potential in the injection assembly between said another valve, the output valve and the injection pump is established, under the control of a controller controlling the injection pump and said another valve on the basis of said measured pressure; and wherein said adding the hydraulic fluid to the hydraulic fluid chamber occurs when the pressure potential in the injection assembly exceeds the pressure in the high pressure part of the hydraulic system.

2. A method according to claim 1, wherein the amount of the added hydraulic fluid to the high-pressure part substantially corresponds to the amount of leaked hydraulic fluid from the high-pressure part to a low-pressure part of the hydraulic system.

3. A method according to claim 1, wherein the amount of the added hydraulic fluid to the high-pressure part is added to the high-pressure part in discontinuous periods of time under the control of the controller on the basis of said measured pressure.

4. A method according to claim 1, wherein the diaphragm gas compressor comprising:
a pressure sensor which establishes a feedback signal representing the pressure in the high-pressure part,
wherein the controller is controlling a pressure potential of injection of hydraulic fluid into the high-pressure part, by control of the injection assembly based on the feedback signal and a hydraulic fluid peak pressure target value of a desired pressure of hydraulic fluid in the high-pressure part.

5. A method according to claim 1, wherein a peak pressure of the high-pressure part of the hydraulic system of the diaphragm gas compressor pressurizing a gas is controlled by the injection assembly wherein:
the injection assembly forming part of a hydraulic fluid path between the low-pressure part of the hydraulic system and the high-pressure part, the injection pump establishing a flow of hydraulic fluid from the low-pressure part to the high-pressure part when the output valve is open, and wherein
a pressure sensor establishes a feedback signal representing the pressure in the high-pressure part,
wherein the injection pump is establishing the pressure potential of injection of hydraulic fluid in the injection assembly when said another valve is closed and when the output valve is closed, and
wherein the controller is controlling the pressure potential of injection of hydraulic fluid into the high-pressure part, by control of the injection assembly based on the feedback signal and a hydraulic fluid peak pressure target value of the desired pressure of hydraulic fluid in the high-pressure part.

6. A method according to claim 1, wherein an amount of hydraulic fluid injected into the high-pressure part in a compression cycle is determined by an established pressure potential of hydraulic fluid, wherein the pressure potential of hydraulic fluid is controlled by controlling said another valve based on the pressure difference between the pressure represented by a feedback signal and a peak pressure target value.

7. A method according to claim 1, wherein a peak pressure target value is between 20% and 15% above the desired pressure of the gas leaving the gas chamber.

8. A method according to claim 1, wherein a feedback signal is established by a pressure sensor comprising a housing mounted to the high-pressure part in which a cylinder with a piston in fluid connection with the hydraulic fluid of the high-pressure part is located, the displacement member and the displacement sensor, wherein the pressure of the hydraulic fluid in the high-pressure part is physically displacing a displacement member and wherein the size of the displacement is measured by a displacement sensor.

9. A method according to claim 1, wherein the compressor is used for pressurizing hydrogen gas in a high-pressure storage of a hydrogen refuelling station or of a fuel cell vehicle to a pressure between 35 MPa and 110 MPa.

10. A hydrogen fueling station comprising a high-pressure diaphragm gas compressor including a pressure sensor comprising a housing connected to a compressor head assembly comprising a lower compressor head and an upper compressor head, the housing comprising a piston movably mounted in a cylinder, the cylinder is fluidly connected to a high-pressure part of a hydraulic fluid system of the compressor, wherein the piston is adapted to be moved in a first direction away from the compressor head assembly by the pressure of hydraulic fluid in the high-pressure part, the piston is thereby adapted to move a displacement member which is movably attached to the housing by one or more flexible suspensions, and wherein the piston is adapted to be moved in a second direction towards the compressor head assembly by the flexible suspension via the displacement member, wherein the compressor is controlled according to the method of claim 1.

11. A method according to claim 1, wherein said pressure potential is established during at least two successive compression cycles and wherein injection of the hydraulic fluid into said hydraulic fluid chamber is established during the compression cycle following said at least two successive compression cycles.

12. A method according to claim 1, wherein said pressure potential is established based on a measured gas inlet pressure based on which said controller is controlling the status of said another valve while running said injection pump.

13. A method according to claim 1, wherein said pressure potential is controlled based on a change of volume in said hydraulic chamber measured by said pressure sensor.

14. A method according to claim 1, wherein a state of health of at least the piston and piston seals of said diaphragm compressor can be established based on information of amount of injection hydraulic fluid.

15. A method according to claim 1, wherein said pressure potential is reduced when an inlet gas pressure is reduced.

16. A diaphragm compressor for pressurizing a gas to a pressure between 10 MPa and 110 MPa, the diaphragm compressor comprising:
an injection assembly forming part of a hydraulic fluid path between a low-pressure part of the hydraulic system and a high-pressure part, the high-pressure part includes a lower compressor head having a hydraulic fluid chamber separated from an upper compressor head having a gas chamber by a diaphragm, the injection assembly comprising an injection pump, an output valve and another valve, a pressure sensor adapted to establish a feedback signal representing pressure in the high-pressure part, and a controller adapted to control the injection assembly so as to establish a pressure potential of injection of hydraulic fluid based on the feedback signal and a hydraulic fluid peak pressure target value of a desired pressure of hydraulic fluid in the high-pressure part;

wherein said controller and said injection assembly add the hydraulic fluid to the hydraulic fluid chamber when the pressure potential in the injection assembly exceeds the pressure in the high pressure part of the hydraulic system.

17. A diaphragm compressor according to claim 16, wherein the injection pump is adapted to establish a flow of hydraulic fluid from the low-pressure part to the high-pressure part when the output valve is open, wherein the injection pump is furthermore adapted to establish a pressure potential in the injection assembly when said another valve is closed and the output valve is closed.

18. A diaphragm compressor according to claim 16, wherein the pressure potential of injection of hydraulic fluid is established in the injection assembly.

19. A diaphragm compressor according to claim 16, wherein in addition to the hydraulic fluid path between the low-pressure part and the high-pressure part the low-pressure part includes a forward path and a return path, wherein said another valve is located in the return path for controlling flow of hydraulic fluid from the injection pump to a hydraulic fluid reservoir.

20. A diaphragm compressor according to claim 19, wherein the forward path fluidly connects the injection pump to a hydraulic fluid supply station comprising at least one inner wall positioned between a hydraulic fluid inlet from the hydraulic fluid reservoir and the forward path and wherein a hydraulic fluid storage volume is located beneath the at least one inner wall.

21. A diaphragm compressor according to claim 16, wherein said diaphragm compressor is configured for pressurizing a gas to a pressure between 10 MPa and 110 MPA.

22. A diaphragm compressor according to claim 16, wherein said gas chamber is connected to a high-pressure storage and wherein said diaphragm compressor is configured for establishing a pressure in said high-pressure storage above 35 MPa.

23. A Diaphragm compressor according to claim 16, wherein said pressure sensor comprises a cylinder volume the size of which is changeable, wherein said cylinder volume is configured to act as overpressure protection of said hydraulic system in that said cylinder volume is configured to receive an additional volume of hydraulic fluid from said hydraulic fluid chamber in case of the existence of said additional volume of hydraulic fluid when said diaphragm is in its top position.

* * * * *